No. 611,001. Patented Sept. 20, 1898.
J. F. McELROY.
ELECTRIC HEATING SYSTEM.
(Application filed July 6, 1896.)
(No Model.) 6 Sheets—Sheet 1.

No. 611,001. Patented Sept. 20, 1898.
J. F. McELROY.
ELECTRIC HEATING SYSTEM.
(Application filed July 6, 1896.)
(No Model.) 6 Sheets—Sheet 3.

Witnesses:
Chas. B. Mitchell
Geo. A. Gregg

Inventor
James F. McElroy
by, Ward & Cameron
Atty's

No. 611,001. Patented Sept. 20, 1898.
J. F. McELROY.
ELECTRIC HEATING SYSTEM.
(Application filed July 6, 1896.)
(No Model.) 6 Sheets—Sheet 4.

Witnesses:
Chas. B. Mitchell.
Geo. A. Grigg.

Inventor
James F. McElroy,
By Ward & Cameron
Att'ys.

No. 611,001. Patented Sept. 20, 1898.
J. F. McELROY.
ELECTRIC HEATING SYSTEM.
(Application filed July 6, 1896.)
(No Model.) 6 Sheets—Sheet 5.

Witnesses
Chas. B. Mackee.
Geo. A. Gregg.

Inventor
James F. McElroy
By Ward & Cameron.
Atty's.

No. 611,001. Patented Sept. 20, 1898.
J. F. McELROY.
ELECTRIC HEATING SYSTEM.
(Application filed July 6, 1896.)
(No Model.) 6 Sheets—Sheet 6.

UNITED STATES PATENT OFFICE.

JAMES F. McELROY, OF ALBANY, NEW YORK, ASSIGNOR TO THE CONSOLIDATED CAR-HEATING COMPANY, OF SAME PLACE.

ELECTRIC-HEATING SYSTEM.

SPECIFICATION forming part of Letters Patent No. 611,001, dated September 20, 1898.

Application filed July 6, 1896. Serial No. 598,164. (No model.)

*To all whom it may concern:*

Be it known that I, JAMES F. MCELROY, a citizen of the United States, residing in the city and county of Albany, State of New York, have invented a new and useful Improvement in Electric-Heating Systems, of which the following is a specification.

My invention relates to a system for heating cars propelled by electricity; and the objects of my invention are to provide a system for heating cars propelled by an electric motor by means of the electricity generated by the motor when its source of electric supply is cut off and the motor is converted into an electric generator, to provide apparatus by which said system may be operated, and also to provide a switching apparatus, an anti-sparking apparatus, and means for connecting and disconnecting the controller and the switch in connection with or independent of the heating apparatus. I attain these objects by means of the mechanism illustrated in the accompanying drawings, in which—

Similar letters and numerals refer to similar parts throughout the several views.

The apparatus employed consists of such as is now used and well known in the art and may be described by reference to the particular apparatus employed by the Westinghouse and General Electric companies as consisting of one or two motors on the car, driven by current from some suitable source, control of the current being had by means of what is known as a "controller," which may be either a multiple-series controller, a series controller, or a multiple controller.

By those skilled in the art it is well known that the controller, when the handle is turned to the zero-point, opens all the connections from the trolley to the various resistances and opens the field and armature connections and also the connections to the ground. I therefore design to employ suitable apparatus for combining the connections to the fields and armatures of the motors, so as to make a series-wound electric generator or generators and connect such generator or generators into a local circuit containing the electric heaters, and I also provide suitable apparatus for arranging the electric-heating resistances in various ways, so as to put it in the power of the operator to vary the resistance of the circuit, and hence vary the amount of current generated, and therefore vary the retarding action of the generation of the current upon the movement of the car. The device therefore acts as a brake upon the motion of the car as well as a generator of electric current for heating purposes, the intention being to convert the moving energy of the car into electricity and employ that electricity for the purpose of heating the car by means of heaters having more or less capacity for storing heat, and in this way heating the car without taking any current from the trolley, and in such a way that the heating of the car does not represent any cost for the energy employed, and incidentally I employ the resisting action as a braking system. It is understood that the heat would be periodic, as the current would only be generated during such times as it would be desired to hold the car in check or to bring it to a standstill. For this reason it is desirable that means be provided for absorbing the heat quickly as it is generated, so that the heaters may give out heat during the intervals when the motors are not employed for generating current.

Upon the platform $A^3$ of a car I place the controller $B^3$ and adjacent thereto a switch incased within a suitable casing $C^3$. For the purpose of operating the switch and the controller by means of a single handle I secure to the upper end of the switch-spindle a sprocket-wheel $a$, which is connected by a chain $a'$ to a corresponding sprocket-wheel $b$, loosely mounted on the spindle of the controller. Within the casing B', built up from what is ordinarily the top of the controller, I arrange an inwardly-projecting ledge E, which ledge is provided with an upwardly-projecting cam-shaped portion $e$. Upon the ledge E the end of the idler-lever F rides, operated by the handle F', carrying projecting from its lower surface a pin $f$, adapted to engage with the opening $f'$ in the arm G, secured to the sprocket-wheel $b$ and so arranged that when the pin $f$ is within the opening $f'$ in the arm G the movement of the handle F' will cause a rotating motion of the sprocket-wheel $b$, thus imparting motion to the switch within the casing $C^3$. When the handle F' is moved to such a position that the end of the idler-lever F is forced upward because of the cam-shaped contour of the ledge E, the pin $f$ will at last be disengaged from the opening $f'$ and therefore removed from contact with the arm G. The point of disengagement is shown at G' in Fig. 8.

The controller is operated by means of the lever H, attached to the spindle $B^2$ of the controller, and is also provided with an opening $h$, adapted to receive the pin $f$ on the idler-lever F. Thus when the handle is moved to that position shown at $e$ in Fig. 8 and when it becomes disengaged from the arm G a further movement of the handle will cause an engagement with the controller-lever H, after which the controller is operated by the movement of the handle F'.

Figure 8:
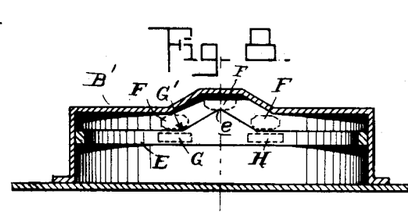
Fig. 8 is a vertical section on the lines 5 6 6 5 of the casing shown in Fig. 7 with the working parts removed.

When the arm G and the controller-lever H are in the position shown in Fig. 8, they are in the position designated on the controller and on the switch as "zero." It will be seen that there is no interlocking between the switch-operating arm G and the controller-operating lever H, but that the handle F' connects with one or with the other, but never with both simultaneously.

Figure 25:
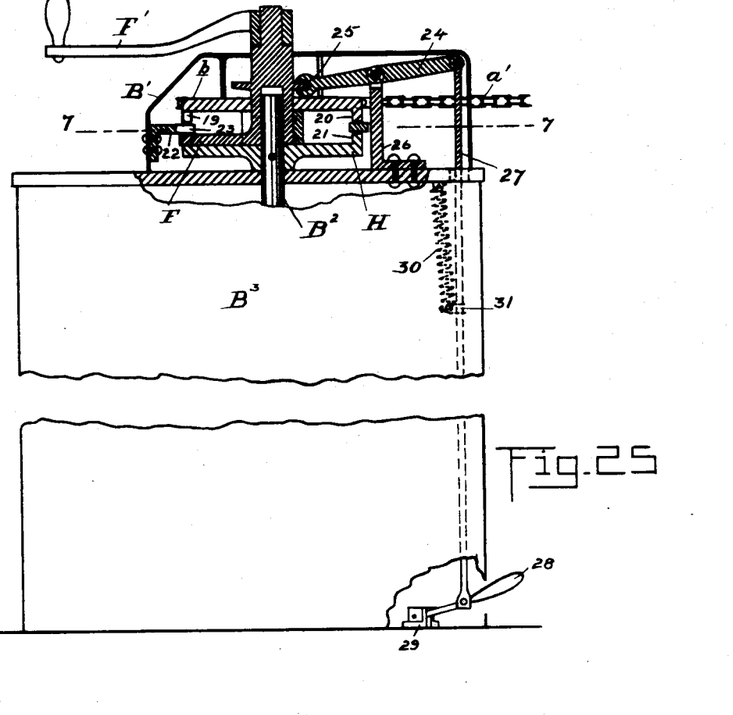
Fig. 25 is an elevation, partly in section, of a modified form of the controller and connections.
Figure 26:
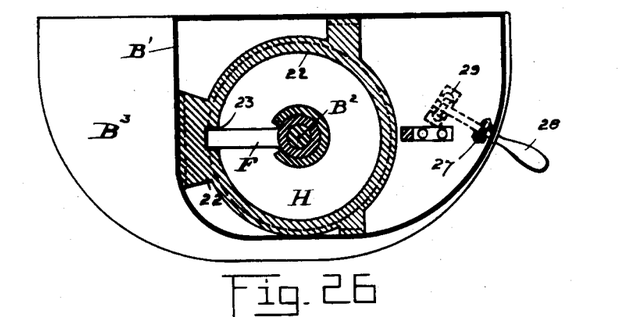
Fig. 26 is a horizontal section along the lines 7 7 on Fig. 25.

I do not limit myself to the above-described means of connecting the handle and the switch-operating arm or the controller-operating lever, since this may be done by means of a foot-lever controlling suitable mechanism for effecting the disengagement of one and the engagement of the other. I show in Figs. 25 and 26 a means for accomplishing this result. The sprocket-wheel $b$ is provided with a rim 20, extending from its lower surface downward, within which rim there is cut a slot at 19. The idler F is connected by means of a lever 24 with a rod 27, the end of which is attached to the foot-lever 28, fulcrumed at 29 to the floor of the car. I arrange a spring 30 on a collar 31 on the rod 27, attaching the other end of the spring to the frame of the controller, the tendency of the spring being to raise the rod 27. The lever 24 is fulcrumed, between the rod 27 and the connection 25 between the idler F and said lever 24, to the support 26, attached to the controller. Thus by pressing downward on the foot-lever 28 the idler F will be raised and engage with the sprocket-wheel $b$, when the slot 19 in the rim of the sprocket-wheel is in position to receive the idler F. I place the ring 22 in position rigidly attached to the frame B' of the controller, within which ring is a slotted opening 23, through which the idler F may pass. The disk H, attached to the spindle $B^2$ of the controller, is also provided with a rim 21, extending above the surface of the lever, and this rim is also provided with a slot, into which the idler F may be placed, occupying the position shown in Fig. 25. The position of the ring 22 and the slots in the rims 20 and 21 of the sprocket-wheel and lever are so arranged in relation to each other that when the switch and controller are at zero the slots in the sprocket-wheel and the lever are in alinement with the slot in the ring 22 and therefore an engagement may be made between the idler and the switch-operating mechanism or between the idler and the controller-operating mechanism only when both switch and controller are at zero, and there can be no connection between the idler and the controller until after the idler has become separated from the switch-controlling mechanism, and vice versa.

The handle of the controller is so constructed that it may be carried from one end of the car to the other when the direction of motion of the car is reversed.

Figures 9, 10, 11, 12, 13:
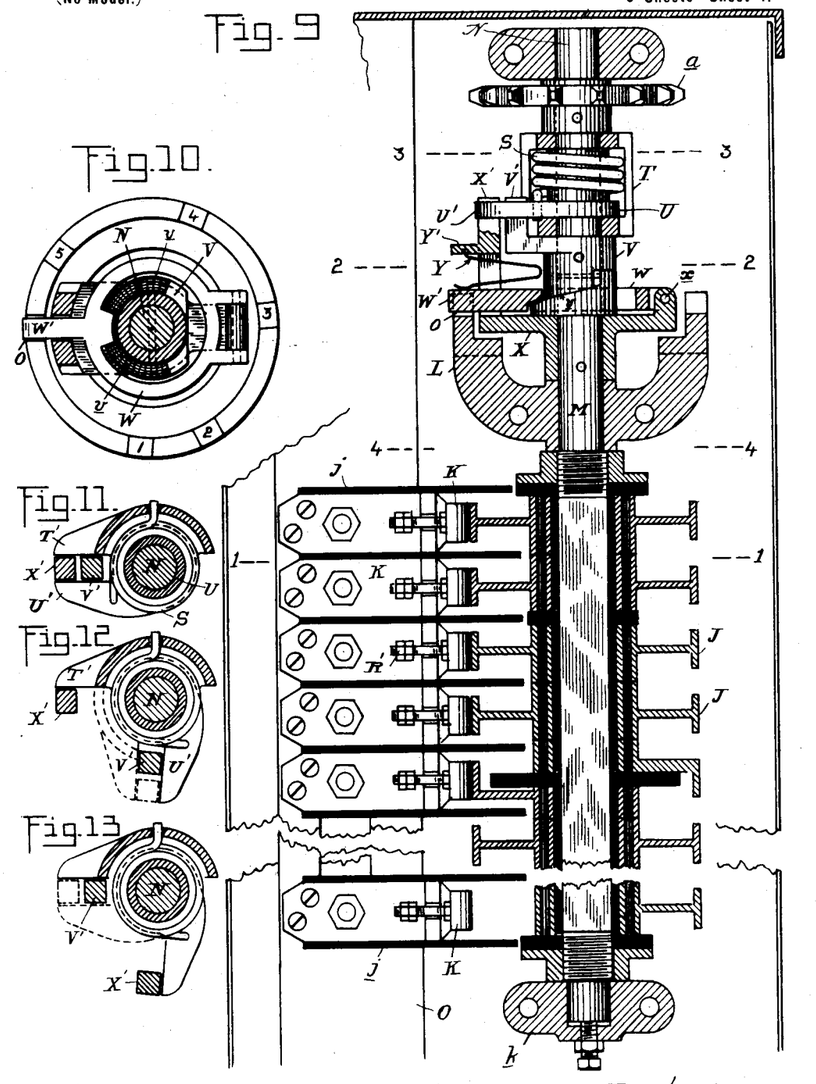
Fig. 9 is a vertical section of the switch.
Fig. 10 is a plan, partly in section, through 2 2 on Fig. 9.
Fig. 11 is a cross-section through 3 3 on Fig. 9.
Fig. 12 is a cross-section along the lines 3 3 on Fig. 9, illustrating a method of operating the switch.
Fig. 13 is a cross-section along the lines 3 3 on Fig. 9, illustrating a method of operating the switch.
Figures 14, 15, 16, 17, 18, 19, 20, 21, 22, 23:
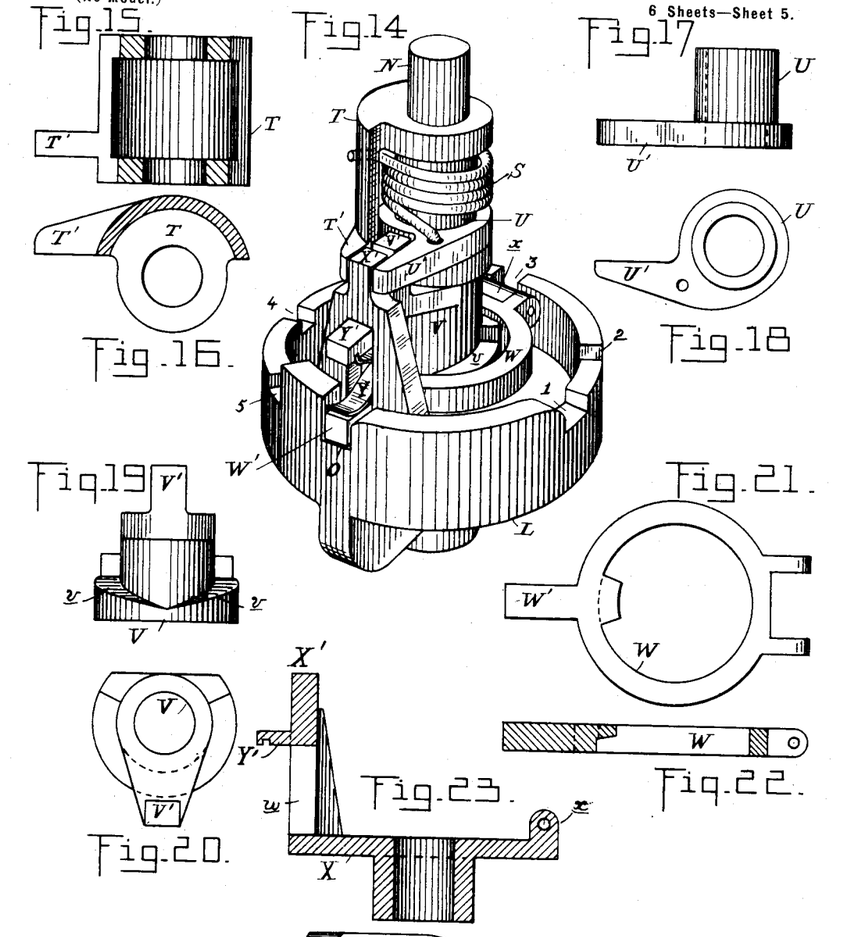
Fig. 14 is a perspective view of that part of the switch between the lines 4 4 and 3 3 on Fig. 9.
Fig. 15 is a vertical section of the thimble T.
Fig. 16 is a cross-section of the thimble T.
Fig. 17 is an elevation of the collar U.
Fig. 18 is a plan of the collar U.
Fig. 19 is a front elevation of the cam-plate V.
Fig. 20 is a plan of the cam-plate V.
Fig. 21 is a plan of the latch-plate W.
Fig. 22 is a section of the latch-plate W.
Fig. 23 is a section of the plate X.
Figure 24:
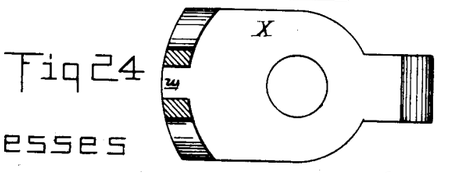
Fig. 24 is a plan of the plate X.

I construct my switch preferably in the cylindrical form shown in section in Fig. 9, made up of metallic contact-pieces J, engaging with brushes K, provided with insulating-blocks $j$, all connected up in any suitable manner, but preferably as hereinafter more particularly described and shown. The switch is provided with a step-bearing $k$. At the upper end of the switch proper I provide a plate L, having its upper surface irregular in form, indented at intervals, forming the notches 0 1 2 3 4 5. To the spindle M, carrying the cylinder, I key the plate X, provided with a hinge-joint $x$, and the upwardly-projecting post X'. To the plate X, I hinge at $x$ the latch-plate W, the latch W' adapted to pass through the opening $w$ in the post X' and rest upon the plate L. For the purpose of keeping the latch W' in contact with the surface of the plate L or within the indentations in said plate I place a spring Y between the said latch W' and the bracket Y' on the post X', as shown in Fig. 9, the action of the spring tending to force downward the latch-plate W. Secured to the spindle N, above the plate X, and enveloping the end of the spindle M, I key the cam-plate V, which plate is provided with two inclined surfaces $v\ v$, meeting each other at their lowest point, gradually rising to the right and the left, respectively, as shown in Fig. 19. Said cam-plate is also provided with a post V'. On the spindle N, I place the collar U, provided with the lug U', to which I secure one end of the spiral spring S. The collar U is placed just above the cam-plate V, and the lug U' is adapted to come in contact with the posts V' and X'. Upon the spindle N and keyed thereto I also place the thimble T, which is provided with the lug T'. The thimble T partly envelops the collar U, and the lug T' is adapted to engage with the opposite sides of the posts V' and X' from those which the lug U' engages, and to the side of the thimble T, I secure the opposite end of the spring S, the resiliency of the spring tending to hold the lugs T' and U' in contact with the posts V' and X'.

The operation of my switch is apparent. The movement of the sprocket-wheel $a$, causing a like movement in the spindle N, operates the cam-plate V, forcing one of the cam-surfaces thereon beneath the latch-plate W, tending to force the latch W' out of its notch in the plate L and at the same time moving the post V', which is attached to the cam-plate V. The movement of the post V' causes either the lug U' or the lug T' to move, depending upon the direction of the movement of the spindle, the movement of either of which operates to increase the tension of the spring S, one of said lugs being held securely against the post X' until the latch W' is forced out of the notch, when the spring S forcibly throws the post X', and therefore the latch W', into the next notch, when the posts V' and X' will again be in conjunction, as shown in Figs. 11, 12, and 13, illustrating the movement of the cylinder N, first to the right, as shown in Fig. 12, the dotted line showing the position of the post X' when it leaves its normal position in response to the action of the spring S after the latch W' is liberated from its notch, and Fig. 13 showing the reverse operation, when the spindle N is moved in the opposite direction. The switch-cylinder being secured to the spindle M, to which the latch-plate W is connected by the plate X, the movement of the post X' and the latch W' causes a corresponding movement of the switch-cylinder. The metallic contacts upon the cylinder are so arranged that the position of the brushes upon the contacts is changed simultaneously and contacts are made positively without the possibility of burning or sparking.

Figure 4:
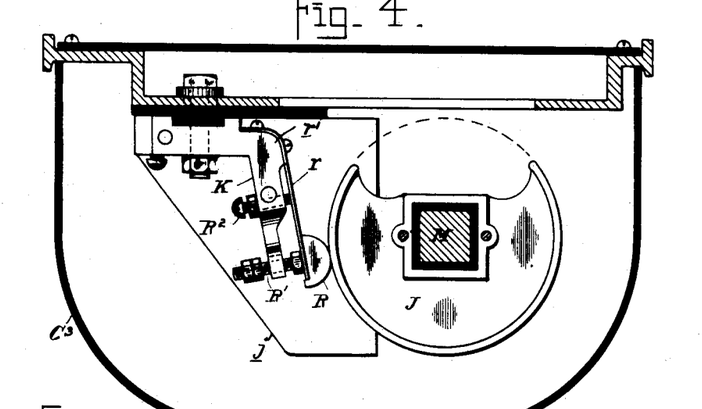
Fig. 4 is a cross-section along the lines 1 1 on Fig. 9.
Figure 5:
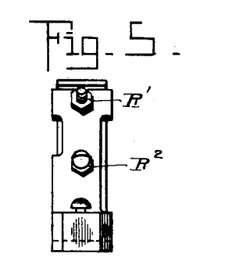
Fig. 5 is an elevation of the back of the brush.
Figure 6:
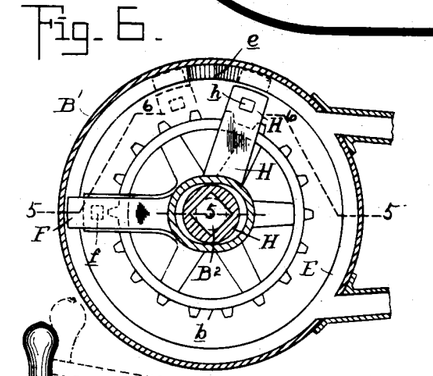
Fig. 6 is a plan of the top of the controller.
Figure 7:
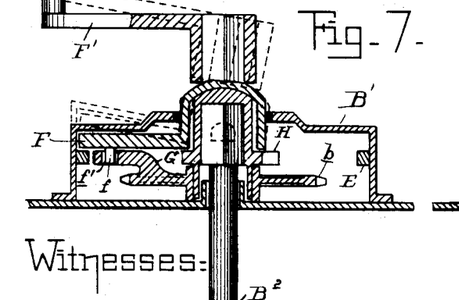
Fig. 7 is a vertical section on lines 5 5 5 on Fig. 6.

I construct the switch-cylinder preferably as shown in Fig. 9, in which the metallic plates J, providing contact-surfaces of circular form, extend more or less of the distance around, depending upon the positions necessary for the contacts with the brushes, said plates being arranged upon the spindle M and properly insulated. (See Fig. 4.) To the side plate O, I attach the brushes K, suitably connected and adapted to engage with the contacts J. Between the brushes K insulating-blocks $j$ are placed, which blocks also extend between the contact-plates J on the side of the switch occupied by the brushes. In order to construct a brush in such a manner that it may be adjusted in reference to the contact-plate J, I place a metallic finger R on the end of a flat spring $r$, secured to the brush-frame $r'$ at the end of the spring-plate $r$ opposite to that to which the metallic finger R is secured. By means of the bolt R', passing through the end of the brush-frame $r'$, I can arrange a limit to the backward motion of the metallic brush, which may be locked in the position desired. For the purpose of intensifying the spring $r$ I place the bolt $R^2$ between the contact-finger R and that end of the spring-plate attached to the brush, by the operation of which bolt $R^2$, I can cause the spring to exert a greater pressure.

Figure 1:
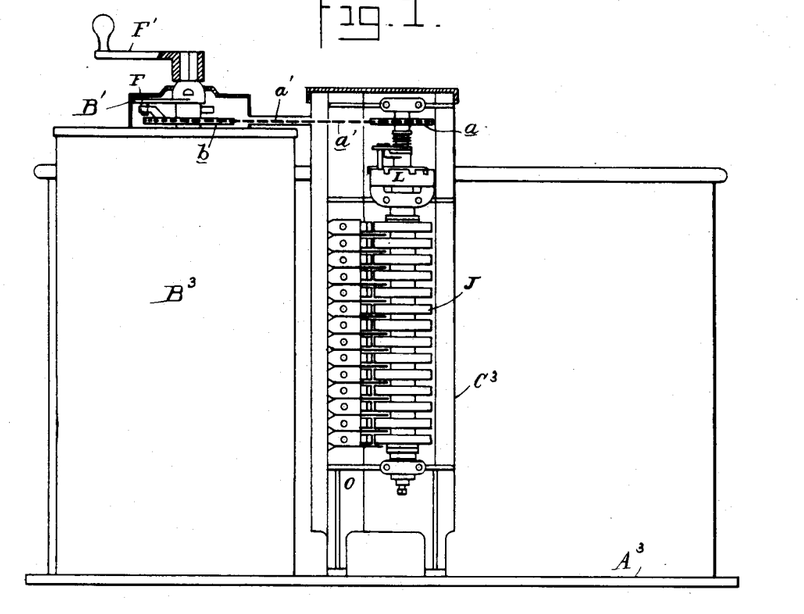
Figure 1 is a front elevation of the controller of an electric car, showing my switch and connections in vertical section.
Figure 2:
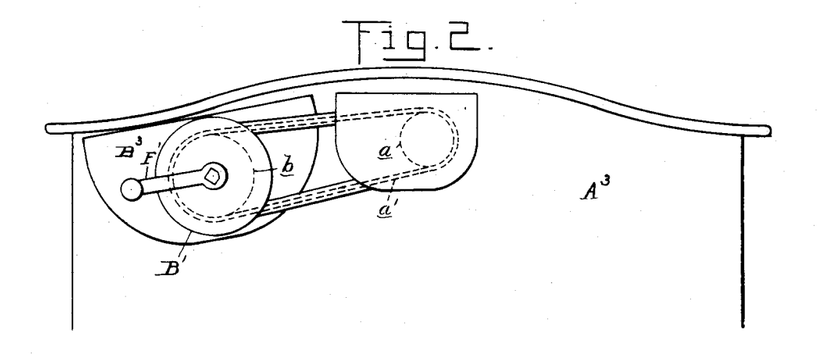
Fig. 2 is a plan of Fig. 1.
Figure 3:
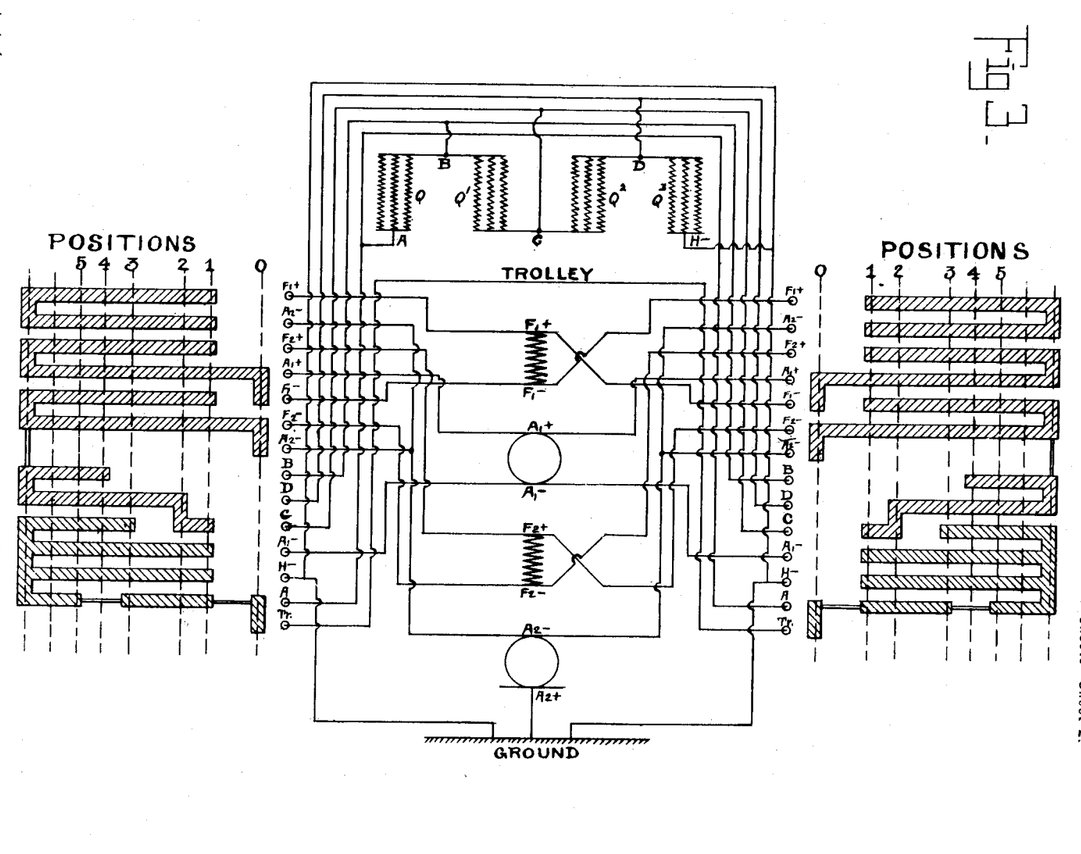
Fig. 3 is a diagrammatic view of the switch-cylinder, motors, and heaters, showing the connections.

From an examination of Fig. 3, which shows a diagrammatic view of the switch-cylinder, the armatures, the fields, and the heaters in the car, the operation of my invention is demonstrated. The positions numbered, respectively, "0," "1," "2," "3," "4," and "5" illustrate the positions of the switch corresponding to the numbers on the end of the switch-cylinder. The poles of the armatures are distinguished by the letters $A'^+$ and $A'^-$ on one motor and $A^{2+}$ and $A^{2-}$ on the second motor, the fields being designated $F'^+$ and $F'^-$, $F^{2+}$ and $F^{2-}$, respectively. Four heaters Q, Q', $Q^2$, and $Q^3$ are shown, made up of three coils each, preferably arranged in parallel in each heater, the heaters being connected at A, B, C, D, and $H^-$. In the position designated "0" it will be noticed that the armatures and fields are all in connection in such a way that there is no effect made upon the heating apparatus by the current passing through the motors.

It is well known that when two series generators are run together the armatures must be connected in the proper way to the fields in order to excite the magnetism in the fields at the same time, and the connection between the armature and the field of one generator must be connected to the circuit of the other generator at the corresponding point—namely, between its armature and field. This connecting-wire is for the purpose of preventing one generator from exciting and then working back through the other generator, as by the use of this wire both fields would be excited in the same direction from their armatures. The result is that both generators excite the same, and the current from both generators may be utilized for producing heat in the electric heaters. I prefer, however, to employ another method, which is to so arrange the circuits that the armature of one generator is connected in the proper direction to the field of the other and the armature of the second generator is connected to the field of the first. The two generators, therefore, are cross-connected and the armature of one excites the field of the other. The result is that they build up quickly and equally and prevent the necessity of the cross connections, as given in the first arrangement. Either of these methods of connection may be employed, although I preferably employ the second. The switch then cross-connects the armatures and fields in the manner just described and connects these parts into the heater-circuit. After the two generators are cross-connected, which occurs when the switch is removed from the zero position, the momentum of the car operates to drive the motors, causing them to act as dynamos and to generate a current.

In the first position of the switch $F'^+$ and $A^{2-}$ are connected, $F^{2+}$ and $A'^+$ are connected, and $F'^-$ and $F^{2-}$. At the same time the heater connection C, which lies between the two middle heaters, and the heater connection $H^-$ and the heater connection A are connected, the current entering at C and going out at A and at $H^-$. In the second position the current enters at the points C and D and passes out at $H^-$ and A, thus intensifying the heat by putting the heaters Q, Q', and $Q^3$ into the circuit, Q and Q' being put in one series and $Q^3$ being arranged parallel to the other two. In the third position the current enters at D and passes out at C and at $H^-$, and the heaters $Q^2$ and $Q^3$ are in parallel. In the fourth position the current enters at B and D and goes out at C and at $H^-$ and the heaters Q', $Q^2$, and $Q^3$ are in parallel. In the fifth position the current enters at B and D and passes out $H^-$, C, and A and all the heaters are arranged in parallel. Thus I may put the heaters in series, in multiple, or in multiple series, and may regulate the intensity of the heat as desired. It is apparent that by increasing the number of heaters and the number of positions on the switch a greater intensity of heat may be acquired, and it is also apparent that the greater the amount of resistance that is turned into the circuit the greater the demand will be upon the motor to furnish current and the quicker and more abrupt will be the stoppage of the car.

I do not limit myself to the construction of apparatus shown for the purpose of accomplishing the result of heating a car by means of electricity generated by the motor when the field connections have been reversed, since other devices may be substituted for those described by me which would be mechanical equivalents therefor.

I do not limit myself to the combination of a heating apparatus with the switching apparatus or with the antisparking apparatus or the means for connecting and disconnecting the controller and switch, since I may use the switch apparatus, the antisparking apparatus, and the means for connecting and disconnecting the controller and switch with a lighting system or with other resistances.

What I do claim as my invention, and desire to secure by Letters Patent, is—

1. In an electric-heating system, the combination of an electric motor, a controller in electrical connection with said motor, a switch, electric heaters, said switch adapted to regulate the intensity of the current carried to said heaters, connections between said switch and said controller, a handle, mechanism capable of being brought in contact with said switch or said controller, said handle adapted to operate said mechanism and through it said switch and said controller independently, substantially as described.

2. In an electric-heating system, an electric motor in combination with the running-gear of a car, a controller, a switch, electric heaters suitably connected, a handle or lever an idler-lever adapted to be operated by said handle, a switch-arm adapted to rotate said switch, a controller-arm adapted to rotate said controller, said idler adapted to engage with said switch-arm and with said controller-arm respectively, a guiding-support for said idler, the movement of said handle causing said idler to engage with said switch-arm or with said controller-arm, depending upon the direction of movement of said handle, substantially as described and for the purpose set forth.

3. A switch composed of a spindle, suitable metallic contact-plates placed thereon, brushes adapted to engage with said contact-plates, said switch adapted to rotate in either direction, an auxiliary spindle, a spring mounted thereon, said auxiliary spindle carrying a collar and a thimble, a post with which lugs on said collar and said thimble respectively engage, a latch adapted to engage with a notched plate, so connected that when the auxiliary spindle is revolved the tension on the spring will be increased until the latch leaves one of the notches and passes into another notch, breaking the contact between the brushes and the plates forcibly and abruptly, substantially as described and for the purpose set forth.

4. A switch, consisting of a series of metallic contact-plates placed on a spindle, a plate connected with said switch having in its periphery a series of notches, a latch connected with said spindle adapted to engage with said notches, and means for forcing said latch from one notch to another forcibly and abruptly, substantially as described.

5. A cylindrical switch, suitable contact-plates thereon, brushes adapted to engage therewith, a plate connected thereto, notches in said plate, a latch adapted to engage with said notches, a spindle carrying a cam-shaped plate, and a spring on said spindle, connected at one end with a collar on the spindle and at the other with a thimble on said spindle, said collar and thimble adapted to engage with a post so arranged that the operation of said spindle will cause the cam-shaped plate to raise the lug from said notches, and force said lug into an adjoining notch, substantially as described, and for the purpose set forth.

6. The combination of a controller, an arm attached to the spindle thereof, a sprocket-wheel placed upon the spindle of said controller, an arm connected with said sprocket-wheel, an idler adapted to engage with the arm of said controller, also with the arm on said sprocket-wheel, a handle adapted to move said idler, with means for causing said idler to become automatically disengaged from one of said arms, and immediately make engagement with the other, substantially as described and for the purpose set forth.

7. The combination of a controller, an arm attached to the spindle thereof, a sprocket-wheel placed upon the spindle of said controller, an arm connected with said sprocket-wheel, an idler adapted to engage with the arm of said controller, also with the arm on said sprocket-wheel, a handle adapted to move said idler, means for causing said idler to become automatically disengaged from one of said arms, and immediately make engagement with the other, with a switch provided with a sprocket-wheel connected by a chain to the sprocket-wheel on said controller, the operation of said sprocket-wheels adapted to change the position of the switch, substantially as described.

8. A switch suitably connected, a brush consisting of a spring-plate, a finger secured thereto, said plate attached to a brush-frame, a bolt passing through said brush-frame and secured to the spring-plate in the rear of the finger, means for locking said bolt in such a manner as to regulate the movement of said brush-finger, with a bolt passing through said brush-frame in contact with said spring-plate adapted to regulate the intensity of the spring, substantially as described.

9. A switch mounted on a spindle, a plate secured thereto, a latch adapted to engage with notches in said plate, an auxiliary spindle, a spring mounted thereon, a means for raising the latch from notches in said plate and at the same time placing said spring under tension, by the movement of said auxiliary spindle causing the latch to be released from said plate and to jump forcibly and abruptly to the next notch thereon, causing a like movement in the switch, substantially as described.

10. A switch composed of a spindle, metallic contacts thereon, brushes adapted to rest on said metallic plates, a notched plate secured to one end of the switch, one surface of said plate irregular in form and indented at intervals, a plate mounted on said spindle to which is hinged a latch adapted to engage in the indentations on said notched plate, a post projecting from said plate carrying said hinge, an auxiliary spindle, a cam-plate secured to said auxiliary spindle, the inclined surfaces of said cam-plate approaching each other at their lowest point and gradually rising to the right and left respectively, said cam-plate carrying a post, a collar mounted on said auxiliary spindle, a spring on said auxiliary spindle, one end of which is secured to said collar, a lug on said collar adapted to engage with said posts, a thimble mounted on said auxiliary spindle, a lug attached to said thimble, adapted to engage with the opposite sides of said posts from which the lug on the collar engages, one end of said spring attached to said thimble, all substantially as described and for the purposes set forth.

JAMES F. McELROY.

Witnesses:
CHAS. B. MITCHELL,
W. W. ERWIN.